Dec. 9, 1947.     G. POURTIER     2,432,442
VARIABLE SPEED GEAR TRANSMISSION
Filed Jan. 4, 1946     4 Sheets-Sheet 1
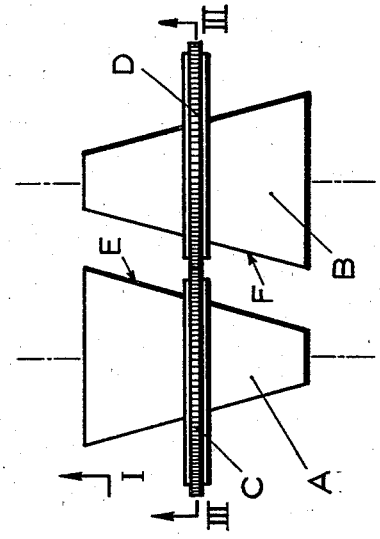
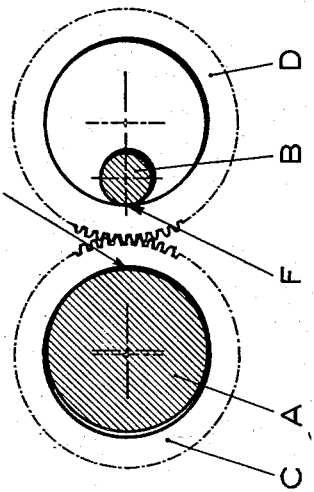
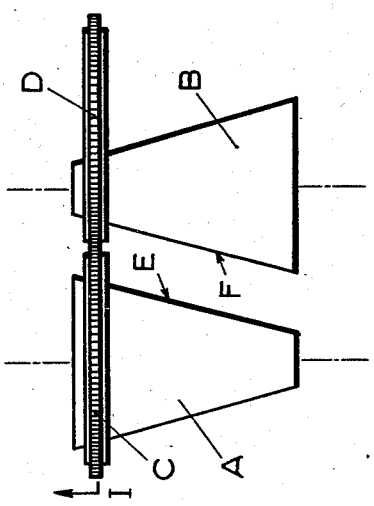

Dec. 9, 1947.  G. POURTIER  2,432,442
VARIABLE SPEED GEAR TRANSMISSION
Filed Jan. 4, 1946  4 Sheets-Sheet 2

Dec. 9, 1947.     G. POURTIER     2,432,442
VARIABLE SPEED GEAR TRANSMISSION
Filed Jan. 4, 1946     4 Sheets-Sheet 3
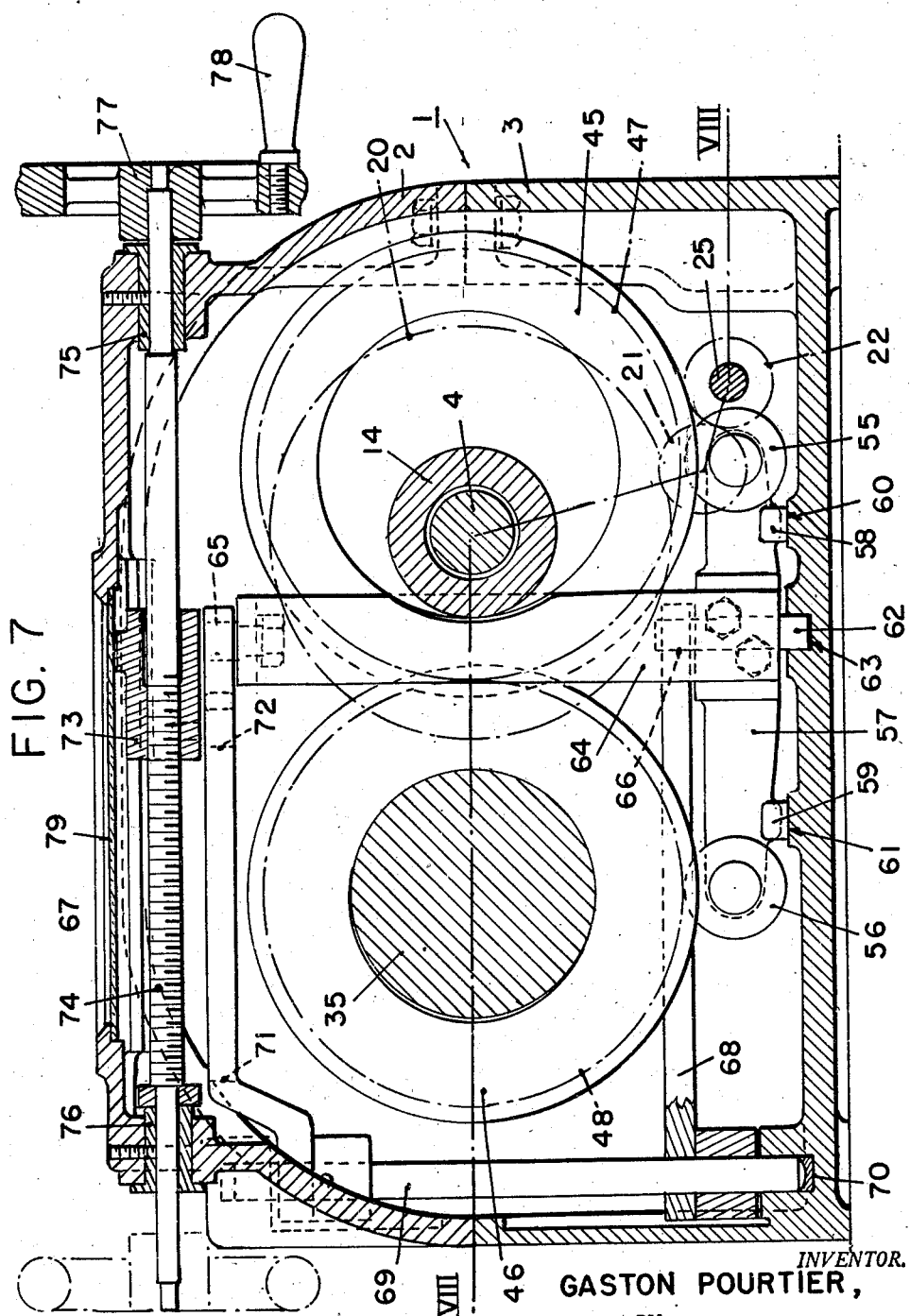
INVENTOR.
GASTON POURTIER,
BY E. F. Wenderoth
Atty Dec. 9, 1947.　　　　G. POURTIER　　　　2,432,442
VARIABLE SPEED GEAR TRANSMISSION
Filed Jan. 4, 1946　　　　4 Sheets-Sheet 4

INVENTOR.
GASTON POURTIER,
BY
C. F. Wenderoth
Atty

Patented Dec. 9, 1947

2,432,442

UNITED STATES PATENT OFFICE 2,432,442

VARIABLE SPEED GEAR TRANSMISSION

Gaston Pourtier, Paris, France

Application January 4, 1946, Serial No. 639,029
In France November 21, 1944

14 Claims. (Cl. 74—325)

This invention relates to an infinitely variable speed gear and one object of the invention is to provide a particularly strongly constructed gear of this kind. Therefore, the invention includes a variable speed gear comprising, in combination, a driving cone, a driven cone mounted with its axis parallel to that of said driving cone, said cones having the adjacent portions of their surfaces, parallel to one another in the plane containing said axes, an annular gear mounted on said driving cone, a second annular gear, in mesh with said first-mentioned gear, mounted on said driven cone, and means for adjusting said annular gears along said cones to lie in any one of a number of planes substantially perpendicular to said axes, the latter being spaced to maintain said gears in mesh in each said plane.

A further object of the invention is to provide means whereby the state of adjustment of the annular gears can readily be determined from outside the casing in which the apparatus is housed.

Yet another object of the invention is to provide effective means for maintaining the required pressure between the cones and annular gears.

Other features and advantages of the invention will hereinafter be described.

In order that the invention may be clearly understood and readily carried into effect one construction in accordance therewith will now be described, by way of example, with reference to the accompanying drawings, in which:

Figures 1 and 2 are diagrams, the first a section on the line I—I in the second, and the second a plan view of the essential parts of the variable speed gear, the transmission members proper being shown in an extreme position corresponding to a step-up or step-down speed ratio;

Figures 3 and 4 are similar to Figures 1 and 2, with Fig. 3 taken on section line III—III of Fig. 4, but the transmission members are shown in a position corresponding to a 1:1 speed ratio;

Figure 7 is a vertical section through the complete variable speed gear, the section being taken substantially on the line VII—VII in Figure 8;

As shown in the diagrammatic Figures 1 to 6 the change speed gear includes two cones A and B of opposite taper with their axes parallel. The first cone passes through a toothed ring C and the second cone passes through a toothed ring D similar to the ring C. The two rings C and D, which are in mesh with one another, making contact with their respective cones at points E and F on the portions of the conical surfaces that lie in the plane containing the geometrical axes of the two cones.

Means, not shown in Figures 1 to 6, are provided for shifting the two rings along the cones to lie in any one of a number of planes to which the two axes of the cones are perpendicular. In the course of such movement, the two rings undergo translational movement in their own plane. The separation between the axes of the cones is such that the two rings are held in mesh in each such plane.

The mode of operation of the apparatus is obvious from an examination of Figures 1 to 6. In the position which the rings C and D occupy in Figures 1 and 2, a step-up ratio is obtained if the cone A is the driving member, or a step-down ratio if the cone considered is driven.

In the positions occupied by the rings in Figures 3 and 4 a transmission ratio substantially equal to unity is obtained. Finally, in the positions occupied by the rings in Figures 5 and 6, a step-down ratio is obtained if the cone A is the driving cone, or a step-up ratio if the cone in question is driven. Clearly, all the intermediate speed ratios can be obtained, these being determined by the intermediate positions which the annular gears C and D can occupy.

Figure 5:
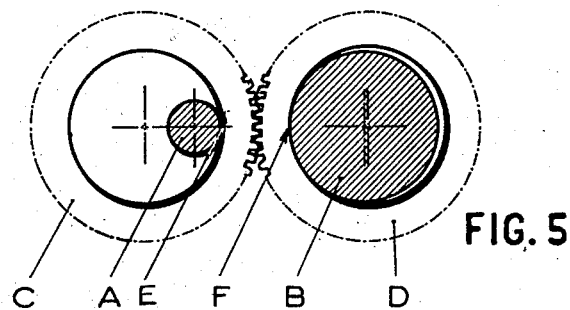
Figures 5 and 6 are similar to Figures 1 and 2, with Fig. 5 taken on section line V—V of Fig. 6, but the transmission members are shown in an extreme position of adjustment opposite to that shown in the first two figures, the position corresponding to a step-down or a step-up ratio.
Figure 6:
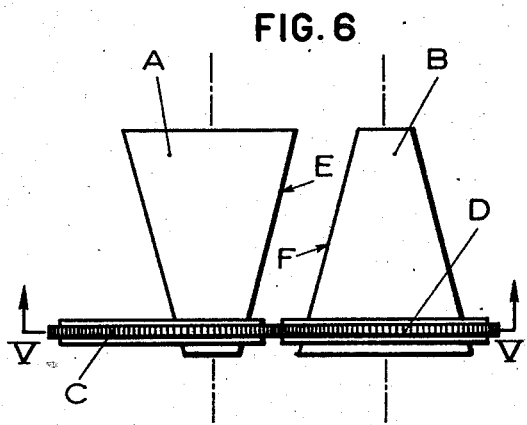
Figure 9:
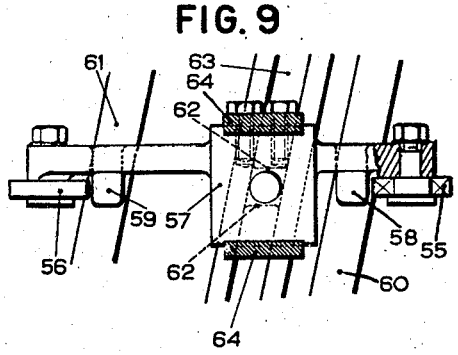
Figure 9 is a plane of a detail, partly in section.
Figure 8:
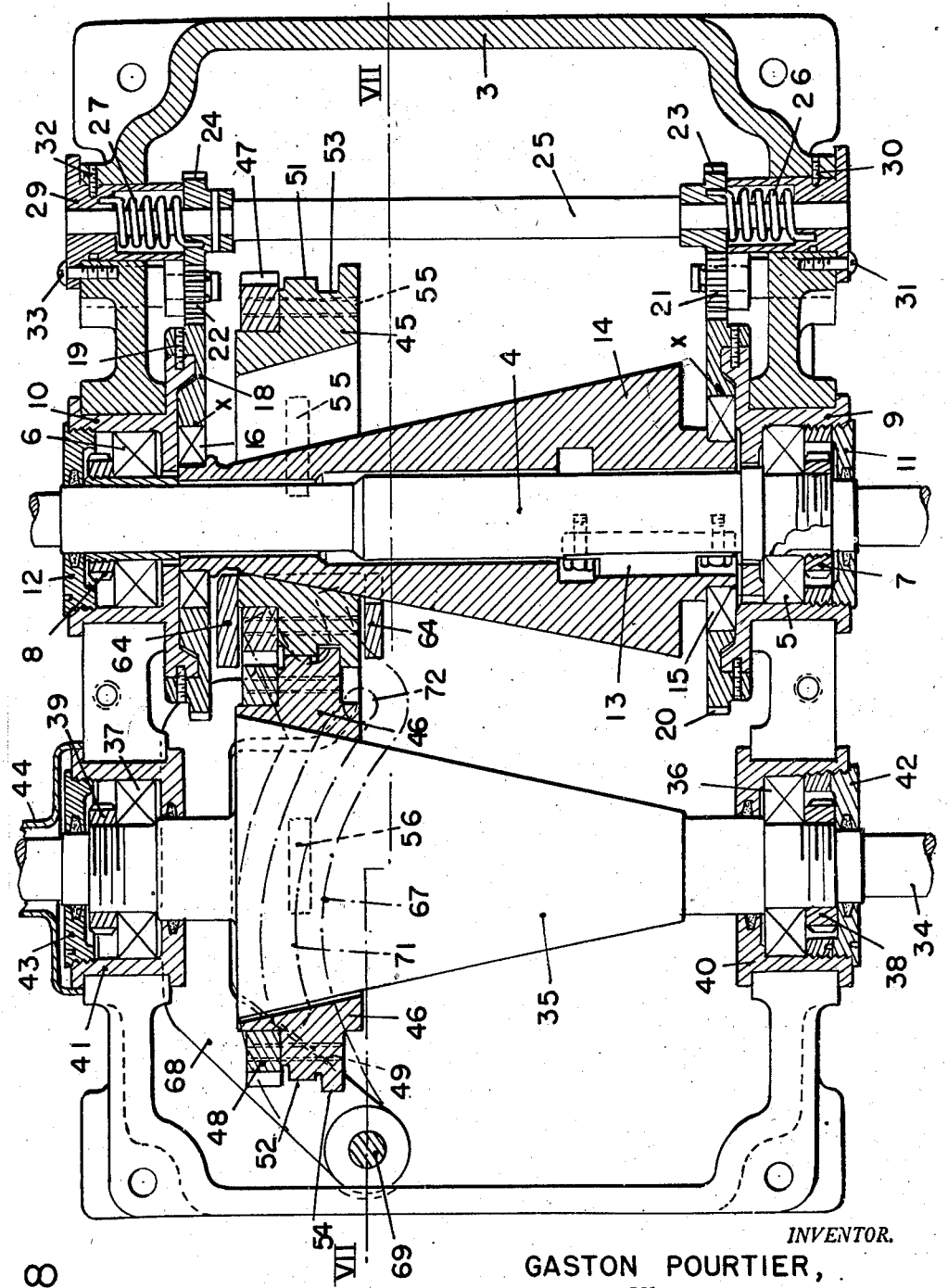
Figure 8 is a sectional plan, the section being taken on the line VIII—VIII in Figure 7.

The details of the example will now be described with reference to Figures 7 to 9.

The mechanism is enclosed in a casing 1 divided into two parts 2 and 3 assembled in a plane containing the geometrical axes of the cones.

The primary shaft 4 turns in bearings 5 and 6 secured (by means of screw threaded nuts 7 and 8 with interposed washers) in sleeves 9 and 10 fixed to the casing and closed by screw threaded covers 11 and 12. This primary shaft carries a key 13 which causes a hollow cone 14 to turn with the shaft 4. The cone 14 runs in two bearings 15 and 16 carried by plates 17 and 18 supported by the sleeves 9 and 10 and maintained in position by retaining pins 19.

The bores X in the plates 17 and 18 are slightly eccentric with respect to their attachment to the sleeves 9 and 10. A portion or the whole of the periphery of each of the plates 17 and 18 is formed with gear teeth 20 in mesh with intermediate pinions 21 and 22, themselves in mesh with pinions 23 and 24 keyed to a shaft 25. At its two ends the shaft 25 carries torsion springs 26 and 27, fixed to adjusting sleeves 28 and 29 which are held stationary by screws 30, 31, 32 and 33. The extremities of the aforesaid springs are in engagement respectively with the pinions 23 and 24 and with the sleeves 28 and 29.

The secondary shaft 34, forming a unit with the cone 35, runs in two bearings 36 and 37 located by means of nuts 38 and 39 and washers in sleeves 40 and 41 closed by screwthreaded covers 42 and 43 and fixed to the casing 1. The idle end of the secondary shaft is hidden by a cover 44.

On the two cones 14 and 35 are supported two rings 45 and 46 of appropriate section and mounting similar teeth 47 and 48 in mesh with one another and formed on collars fixed to the said rings by means of pins 49 and 50. The two rings are formed with tracks 51 and 52, which roll one upon the other, and the ring 45 is formed with a groove 53 while the ring 46 is formed with a rib 54 which projects into the groove 53. Thus, the two rings maintain their positions with respect to one another.

The tracks rest moreover on rollers 55 and 56 on a carriage 57 mounted on shoes 58 and 59 which slide on tracks 60 and 61 formed at the bottom of the part 3 of the casing 1. The carriage 57 is guided by a groove 63 parallel to the portions of the surfaces of the cones 14 and 35 that lie in the plane containing the axes of the cones, slides 62 carried by the carriage 57 projecting into the groove 63. To the carriage 57 is fixed forked member or a stirrup 64 embracing the lateral faces of the two rings 45 and 46 after the fashion of a fork guiding a belt.

On the upper part of the stirrup 64 a gudgeon pin 65 is fixed in alignment with a second gudgeon pin 66 fixed to the carriage 57. The gudgeon pins 65 and 66 are engaged respectively in the forked ends of two levers or arms 67 and 68 keyed to a vertical shaft 69 resting on a footstep bearing 70.

The arm 67, moreover, is formed with a cam groove 71, in which can be adjusted a regulating member 72 fixed to a nut 73 on a lead screw 74, which runs in bearings 75 and 76 and which is controlled by a wheel 77 furnished with an operating handle 78.

The upper face of the casing contains, above the screw 74, a window closed by a transparent protecting plate 79 furnished with a graduated scale and permitting the position of the nut 73 to be determined, and consequently the speed ratio to be known.

The apparatus functions in the following manner. When, with the help of the wheel 77 furnished with the handle 78, the lead-screw 74 is turned the nut 73 is moved together with the cam follower 72. While moving in the cam groove 71, the follower 72 causes the lever 67 to swivel, together with the lever 68 on the shaft 69. The swivelling of the levers 67 and 68 causes the displacement of the carriage 57 with its stirrup 64 and, consequently, the two interengaging rings 45 and 46 are shifted.

Being given that the torque which can normally be transmitted by the apparatus depends ultimately on the friction between the internal surfaces of the rings and the conical surfaces, and consequently on the pressure of contact between the cones and their respective rings, it is desirable to maintain this pressure at a predetermined value which is constant in spite of the relative movement of the surfaces. This result is obtained thanks to the adjustable mounting of the cone 14 which is automatically caused to approach the cone 35 (and which tends, therefore, to press the two rings on to the two corresponding cones) on account of the force constantly exerted by the torsion springs 26 and 27. These springs tend, in effect, to turn the shaft 25 and the pinions 23 and 24 in a direction such that their rotation, communicated by the intermediate pinions 21 and 22, to the plates 17 and 18 brings about, on account of the eccentricity of their bores X, the radial adjustment of the bearings of the cone 14 in the direction of the shaft 34.

Many changes may be made in the disclosed preferred embodiment of the invention without departing from the substance thereof. All such changes and uses not specifically outlined are intended to be covered by the following claims.

I claim:

1. A variable speed gear comprising, in combination, a driving cone, a driven cone mounted with its axis parallel to that of said driving cone, said cones having the adjacent portions of their surfaces parallel to one another in the plane containing said axes, an annular gear, mounted on said driving cone, a second annular gear, in mesh with said first-mentioned gear and, mounted on said driven cone, and means for adjusting said annular gears along said cones to lie in any one of a number of planes substantially perpendicular to said axes, the latter being spaced to maintain said gears in mesh in each said plane.

2. A variable speed gear comprising, in combination, a driving cone, a driven cone mounted with its axis parallel to that of said driving cone, said cones having the adjacent portions of their surfaces parallel to one another in the plane containing said axes, a ring mounted on said driving cone and formed with a peripheral set of gear teeth, a second ring mounted on said driven cone and formed with a peripheral set of gear teeth in mesh with said first mentioned teeth, one of said rings being formed with a peripheral groove while the other said ring is formed with a peripheral rib projecting into said groove so that said rings are held in constant axial positions relatively to one another, and means for moving along said cones the assembly consisting of said rings to lie in any one of a number of planes substantially perpendicular said axes, the latter being spaced to maintain said sets of gear teeth in mesh in each said plane.

3. A variable speed gear comprising, in combination, a driving cone, a driven cone mounted with its axis parallel to that of said driving cone, said cones having the adjacent portions of their surfaces parallel to one another in the plane containing said axes, two rings mounted respectively on said cones and formed respectively with peripheral tracks adapted to roll one upon the other, said rings being further furnished with annular sets of gear teeth in mesh with one another, and means for moving said rings along said cones to lie in any one of a number of planes substantially perpendicular to said axes, the latter being spaced to maintain said sets of gear teeth in mesh in each said plane.

4. A variable speed gear comprising, in combination, a driving cone, a driven cone mounted with its axis parallel to that of said driving cone, said cones having the adjacent portions of their surfaces parallel to one another in the plane containing said axes, two rings mounted respectively on said cones and formed respectively with peripheral tracks adapted to roll one upon the other, said rings being further furnished with annular sets of gear teeth in mesh with one another, two supporting rollers on which said rings respectively roll, and means for moving along said cones the assembly comprising said rings and said rollers, to lie in any one of a number of planes substantially perpendicular to said axes, the latter being spaced to maintain said sets of gear teeth in mesh in each said plane.

5. A variable speed gear comprising, in combination, a driving cone, a driven cone mounted with its axis parallel to that of said driving cone, said cones having the adjacent portions of their surfaces parallel to one another in the plane containing said axes, two rings mounted respectively on said cones, one said ring being formed with a peripheral groove and the other formed with a peripheral rib projecting into said groove so that said rings are held in constant axial positions relatively to one another, two rings formed with gear teeth in mesh with one another detachably fixed respectively about said two first-mentioned rings, two supporting rollers on which said two first-mentioned rings respectively roll, and means for moving along said cones the assembly comprising said rings and said rollers to lie in any one of a number of planes perpendicular to said axes, the latter being spaced to maintain said gear teeth in mesh in each said plane.

6. A variable speed gear comprising, in combination, a driving cone, a driven cone mounted with its axis parallel to that of said driving cone, said cones having the adjacent portions of their surfaces parallel to one another in the plane containing said axes, a carriage, guiding means for said carriage adapted to constrain said carriage to move in a direction parallel to said adjacent portions of the conical surfaces, two annular gears meshing with one another and respectively mounted on said cones, and means carried by said carriage and engaging said gears to move said gears along said cones in company with said carriage along said guiding means, said cones being spaced to maintain said gears in mesh in all positions along said cones.

7. A variable speed gear comprising in combination, a driving cone, a driven cone mounted with its axis parallel to that of said driving cone, said cones having the adjacent portions of their surfaces parallel to one another in the plane containing said axes, a carriage, guiding means for said carriage adapted to constrain said carriage to move in a direction parallel to said adjacent portions of the conical surfaces, two annular gears meshing with one another and respectively mounted on said cones, a forked member carried by said carriage and engaging opposite sides of both said gears between said cones, rollers mounted on said carriage and supporting said gears, and means for moving said carriage along said guiding means to move said gears along said cones.

8. A variable speed gear comprising, in combination, a driving cone, a driven cone mounted with its axis parallel to that of said driving cone, said cones having the adjacent portions of their surfaces parallel to one another in the plane containing said axes, guiding means formed to provide two tracks and a groove extending parallel to said adjacent portions of the conical surfaces, a carriage, shoes supporting said carriage and adapted to slide on said tracks, a slide mounted on said carriage and adapted to be guided by said groove, two annular gears meshing with one another and respectively mounted on said cones, and means carried by said carriage and engaging said gears to move said gears along said cones in company with said carriage along said tracks, said cones being spaced to maintain said gears in mesh in all positions along said cones.

9. A variable speed gear comprising, in combination, a driving cone, a driven cone mounted with its axis parallel to that of said driving cone, said cones having the adjacent portions of their surfaces parallel to one another in the plane containing said axes, guiding means formed to provide two tracks and a groove extending parallel to said adjacent portions of the conical surfaces, a carriage, shoes supporting said carriage and adapted to slide on said tracks, a slide mounted on said carriage and adapted to be guided by said groove, two annular gears meshing with one another and respectively mounted on said cones, a forked member carried by said carriage and engaging opposite sides of both said gears between said cones, rollers mounted on said carriage and supporting said gears, and means for moving said carriage along said guiding means to move said gears along said cones.

10. A variable speed gear comprising, in combination, a casing having a transparent panel, a driving cone within said casing, a driven cone mounted with its axis parallel to that of said driving cone, said cones having the adjacent portions of their surfaces parallel to one another in the plane containing said axes, an annular gear mounted on said driving cone, a second annular gear, in mesh with said first-mentioned gear, mounted on said driven cone, and mechanism for adjusting said annular gears along said cones to lie in any one of a number of planes substantially perpendicular to said axes, said mechanism including an operating member outside said casing and a member inside said casing movable across said transparent panel to indicate the plane in which said gears are located.

11. A variable speed gear comprising, in combination, a casing having a transparent panel, a driving cone within said panel, a driven cone mounted with its axis parallel to that of said driving cone, said cones having the adjacent portions of their surfaces parallel to one another in the plane containing said axes, an annular gear mounted on said driving cone, a second annular gear, in mesh with said first-mentioned gear, mounted on said driven cone, a lead screw rotatably mounted inside said casing, a member outside said casing for rotating said lead-screw, a nut mounted on said lead-screw to be caused thereby to traverse a path readily seen through said transparent panel, and mechanism operatively connecting said nut and said annular gears for adjusting the latter along said cones to lie in any one of a number of planes substantially perpendicular to said axes.

12. A variable speed gear comprising, in combination, a casing having a transparent panel, a driving cone mounted inside said casing, a driven cone mounted with its axis parallel to that of said driving cone, said cones having the adjacent portions of their surfaces parallel to one another in the plane containing said axes, a carriage, guiding means for said carriage adapted to constrain said carriage to move in a direction parallel to said adjacent portions of the conical surfaces, two annular gears meshing with one another and respectively mounted on said cones, a forked member carried by said carriage and engaging opposite sides of both said gears between said cones, a lead screw rotatably mounted inside said casing, a member outside said casing for rotating said lead screw, a nut on said lead screw adapted to be caused thereby to traverse a path readily viewed through said transparent panel, a cam follower mounted on said nut, and a lever device formed with a cam track engaged by said cam follower and operatively connected to said forked member for adjusting the positions of said annular gears along said cones.

13. A variable speed gear comprising, in combination, a cone formed with a longitudinal passage, rotatably mounted bearing members formed with bearings for said cone located slightly eccentrically with respect to the axis of rotation of said bearing members, a shaft passing through said passage, stationary bearing structures for said shaft, means interconnecting said shaft and said cone to cause said shaft and cone to rotate as a unit but permitting said cone to undergo slight radial movement on said shaft, a second cone mounted with its axis parallel to the axis of said first-mentioned cone, two annular gears meshing with one another and respectively mounted on said cones, means for adjusting said annular gears along said cones to lie in any one of a number of planes substantially perpendicular to the axes of said cones, and yielding means adapted to rotate said bearing members thereby maintaining radial pressure between said cones and said annular gears.

14. A variable speed gear comprising, in combination, a cone formed with a longitudinal passage, rotatably mounted bearing members formed with bearings for said cone located slightly eccentrically with respect to the axis of rotation of said bearing members, a shaft passing through said passage, stationary bearing structures for said shaft, means interconnecting said shaft and said cone to cause said shaft and cone to rotate as a unit but permitting said cone to undergo slight radial movement on said shaft, a second cone mounted with its axis parallel to the axis of said first cone, two annular gears meshing with one another and respectively mounted on said cones, means for adjusting said annular gears along said cones to lie in any one of a number of planes substantially perpendicular to the axes of said cones, a rotatable shaft, spring means tending to rotate said shaft about its axis, and gearing interposed between said shaft and said rotatable bearing members whereby said spring means tends to rotate said bearing members and to maintain substantial radial pressure between said cones and said annular gears.

GASTON POURTIER.

REFERENCES CITED

The following references are of record in the file of this patent:

UNITED STATES PATENTS

| Number | Name | Date |
|---|---|---|
| 1,048,220 | Sleeper | Dec. 24, 1912 |
| 1,637,664 | Stoeckicht | Aug. 2, 1927 |